(12) United States Patent

Bulcha

(10) Patent No.: US 12,601,693 B1

(45) Date of Patent: Apr. 14, 2026

(54) ASTRONOMY RECEIVER

(71) Applicant: United States of America as represented by the Administrator of NASA, Washington, DC (US)

(72) Inventor: Berhanu T. Bulcha, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 331 days.

(21) Appl. No.: 18/543,868

(22) Filed: Dec. 18, 2023

Related U.S. Application Data

(60) Provisional application No. 63/444,295, filed on Feb. 9, 2023.

(51) Int. Cl.
| | |
|---|---|
| *G01N 22/00* | (2006.01) |
| *H01P 5/16* | (2006.01) |
| *H01Q 13/02* | (2006.01) |
| *H01Q 21/08* | (2006.01) |
| *H01Q 23/00* | (2006.01) |

(52) U.S. Cl.
CPC .............. *G01N 22/00* (2013.01); *H01P 5/16* (2013.01); *H01Q 13/02* (2013.01); *H01Q 21/08* (2013.01); *H01Q 23/00* (2013.01)

(58) Field of Classification Search
CPC .......... H01P 5/16; H01Q 13/02; H01Q 21/08; H01Q 23/00
See application file for complete search history.

(56) References Cited

U.S. PATENT DOCUMENTS

2025/0150103 A1* 5/2025 Agrawal .............. H04B 1/0483

* cited by examiner

*Primary Examiner* — Vladimir Magloire
*Assistant Examiner* — Eric K Hodac
(74) *Attorney, Agent, or Firm* — Derek J. Langdon; Matthew F. Johnston; Trenton J. Roche

(57) ABSTRACT

A waveguide receiver apparatus includes a power splitter circuit with an attenuation card; a mixer circuit coupled to an output of the power splitter circuit; and an antenna assembly coupled to an output of the mixer circuit. The aspects of the disclosed embodiments provide a highly compact and sensitive 500-600 GHz, 1×8 receiver array, with a conversion loss of less than approximately 11 decibels (dB), a noise temperature of less than 2000 degrees Kelvin (K) at 540 GHz, and a wide intermediate frequency (IF) bandwidth of approximately 70 Gigahertz (GHz).

20 Claims, 7 Drawing Sheets

ASTRONOMY RECEIVER

INVENTION BY GOVERNMENT EMPLOYEE(S) ONLY

The invention described herein was made by one or more employees of the U.S. Government, and may be manufactured and used by or for the Government for governmental purposes without the payment of any royalties thereon or therefore.

ORIGIN OF THE INVENTION

Field

The aspects of the disclosed embodiments relate generally to remote sensing tools to explore the volatile gas giants, such as Earth, terrestrial planets, comets, satellite plumes, and asteroid exospheres. In particular, the aspects of the disclosed embodiments are directed to a sensitive and compact, 530-600 GHz imaging system, with a multiple-pixel (1×8) receiver. The receiver of the disclosed embodiments is configured to reduce the current Size, Weight, and Power (SWaP) and enhance simultaneous detection capability for astronomy, particularly planetary science applications.

Background

A heterodyne-based submillimeter-wave spectrometer is a powerful remote sensing tool to explore volatile gas giants such as terrestrial planets, comets, satellite plumes, and asteroid exospheres within our planetary systems and beyond. However, due to the absence of broadband and multipixel instruments that do not require cryogenics in the 500-600 GHz range, a rotational and translational lines of molecular species such as $H_2O$ (Water), HDO (Hydrogen Deuterium Oxide or Semi-heavy water), $SO_2$ (Sulfer Dioxide), CO (Carbon Monoxide), $H_2S$ (Hydrogen Sulfied), $H_2O_2$ (Hydrogen Peroxide), $O_3$ (Oxone), and $NH_3$ (Amonia) are not well studied.

The heterodyne instrument combines a signal from Local Oscillator (LO) with a Radio Frequency (RF) (i.e., the targeted molecular spectral line) to translate to a much lower frequency, known as Intermediate Frequency (IF). The down-converted broadband IF signal can be digitized to uncover the spectral response of the targeted molecular spectral lines. The current technology uses cascaded components—mostly single-pixel—to develop submillimeter-wave-based receivers. The receiver LO contains an Amplifier Multiple Chains (AMC) that is assembled by cascading amplifier and multiplier components with a standard waveguide interface. As the receiver's frequency increases, cascades of more multipliers are required, which increases the total size, weight, and power (SWaP).

For example, a 500-600 GHz receiver requires a multiplication factor of 48× for an input frequency of ~10 GHz. Inversely, the waveguide size reduces as the operating frequency increases; in this frequency band, a 190×380 um waveguide is required, which tightens the alignment tolerance and increases machining cost to preserve efficiency. In addition, to create the waveguide interface, a certain length of waveguide channel is required, and additional length at the submillimeter frequency increases the loss of the system, which will degrade the system's efficiency.

In general, cascaded systems are large and heavy, and require large DC power to operate. It would be advantageous to provide a heterodyne receiver that has lower SWaP (Size, Weight, and Power) for planetary science applications as well as other applications in communication and military imaging systems.

The current technology of a single-pixel receiver at the millimeter-wave provides incomplete information due to limitations on the number of pixels on molecular targets that need to have simultaneous measurement of the different tangential heights during observation. As a result, a single-pixel spectrometer requires more time to perform a scan with heavy and power-hungry mechanisms.

An additional limitation of the current receiver technology is the narrow intermediate frequency (IF) bandwidth of less than 20 GHz which limits the frequency window of molecular detection and limits the ability to observe multiple molecular transitions at the same time during the receiver down-conversion process.

Accordingly, it would be desirable to provide a receiver for astronomy that addresses at least some of the problems described above.

SUMMARY

The aspects of the disclosed embodiments are directed to a compact, sensitive, wideband and multi-pixel receiver apparatus that is configured to down-convert many molecular species simultaneously in the 530-600 GHz frequency range. The receiver apparatus of the disclosed embodiments is sensitive and tightly integrated receiver array, which can provide benefits such improving the sensitivity of the receiver by a factor of $\sqrt{n}$, where n is the number of pixels, as well as providing a small-size payload for space-based and suborbital instruments, such as CubeSat, for example.

This and other advantages of the disclosed embodiments are provided substantially as shown in, and/or described in connection with, at least one of the figures, as set forth in the independent claims. Further advantageous modifications can be found in the dependent claims.

According to a first aspect, the disclosed embodiments are directed to an apparatus. In one embodiment, the apparatus is a waveguide receiver apparatus that includes a power splitter circuit with an integrated attenuation card; an integrated multiplier and mixer circuit coupled to an output of the power splitter circuit; and an antenna assembly coupled to an output of the mixer circuit. The aspects of the disclosed embodiments provide a highly compact and sensitive 500-600 GHz, 1×8 (eight pixel) receiver array, with a conversion loss of less than approximately 11 decibels (dB), a noise temperature of less than 2000 degrees Kelvin (K) at 540 GHz, and a wide intermediate frequency (IF) bandwidth of approximately 70 Gigahertz (GHz).

In a possible implementation form, the power splitter with an integrated attenuation card is a hybrid power splitter.

In a possible implementation form, the input circuit to the receiver array includes a first waveguide assembly and a second waveguide assembly. The waveguide assemblies of the input circuit divide an input signal into frequencies in a range of 80-100 Gigahertz.

In a possible implementation form, the mixer circuit comprises a sub-harmonic mixer circuit configured for a 530-600 GHz band.

In a possible implementation form, the mixer circuit comprises a three-port device configured to allow a local oscillator signal, a radio frequency signal and an intermediate frequency signal.

In a possible implementation form, a Trippler circuit is disposed between an output of the splitter circuit coupled to the input circuit and an input of the power splitter circuit.

In a possible implementation form, a frequency at an output of the Tripler circuit is in the range of 240-300 GHz.

In a possible implementation form, the antenna assembly comprises horn antennas.

In a possible implementation form, the antenna assembly comprises diagonal horn antennas.

In a possible implementation form, an output of a diagonal horn antenna is in a range of 480-750 Gigahertz.

In a possible implementation form, a center-to-center spacing of adjacent diagonal horn antennas in a 1×8 multipixel receiver is 9 millimeters.

In a possible implementation form, the power splitter circuit, the Tripler and the mixer circuit and the antenna assembly are integrated on a waveguide array block.

In a possible implementation form, dimensions of the waveguide array block are 62 mm×81 mm.

In a possible implementation form, the apparatus comprises a 1×8 receiver array.

In a possible implementation form, a combined length of the first waveguide assembly and the second waveguide assembly is 62 millimeters.

In a possible implementation form, a width of the second waveguide assembly is 81 millimeters.

In a possible implementation form, the mixer circuit is disposed on a Quartz substrate.

In a possible implementation form, a thickness of the Quartz substrate is 20 micrometers.

In a possible implementation form, the mixer circuit comprises a conductor layer of 0.5 μm gold metal deposited on the Quartz substrate with circuit pattern disposed thereon, as described with reference to FIG. 4.

In a possible implementation form, a size of an array block on which the antenna assembly is disposed in 62 mm×81 mm with channel dimensions as described with respect to FIG. 5.

According to a second aspect, the disclosed embodiments are directed to a 1×8 waveguide receiver apparatus. In one embodiment, the waveguide receiver apparatus includes a 1×8 receiver array disposed on a waveguide substrate. The 1×8 receiver array has a first circuit branch and a second circuit branch. The first circuit branch and the second circuit branch both include a first splitter circuit configured divide an input signal; a first Tripler circuit coupled to a first output of the first splitter circuit and a second Tripler circuit coupled to a second output of the first splitter circuit; a third splitter circuit coupled to an output of the first Tripler circuit and a fourth splitter circuit coupled to an output of the second Tripler circuit; a first mixer circuit coupled to a first output of the second splitter circuit and a second mixer circuit coupled to a second output of the second splitter circuit; a third mixer circuit coupled to a first output of the third splitter circuit and a fourth mixer circuit coupled to a second output of the third splitter circuit; a first antenna coupled to an output of the first mixer circuit; a second antenna coupled to an output of the second mixer circuit; a third antenna coupled to an output of the third mixer circuit; and a fourth antenna coupled to an output of the fourth mixer circuit.

In a possible implementation form the second splitter circuit and the third splitter circuit each respectively comprise a hybrid power splitter circuit with an integrated coupler attenuator.

In a possible implementation form the integrated coupler attenuator comprises an attenuator film embedded on the waveguide substrate.

In a possible implementation form the attenuator film has a trapezoidal shape.

In a possible implementation form the attenuator film is a 75 micrometer (μm) thick resistive substrate on a surface of the waveguide substrate.

In a possible implementation form the integrated power coupler is configured to balance a power split of a respective splitter circuit.

In a possible implementation form the hybrid power splitter circuit is configured to divide a signal at frequencies in the range of 240-300 Gigahertz.

In a possible implementation form the one or more mixer circuits includes eight (8) mixer circuits.

In a possible implementation form a mixer circuit comprises a sub-harmonic mixer circuit configured for a 530-600 GHz band with ultrawide IF bandwidth.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the aspects of the disclosed embodiments will be described in more detail with reference to the example embodiments shown in the drawings, in which.

DETAILED DESCRIPTION

The following detailed description illustrates exemplary aspects of the disclosed embodiments and ways in which they can be implemented. Although some modes of carrying out the aspects of the disclosed embodiments have been disclosed, those skilled in the art would recognize that other embodiments for carrying out or practicing the aspects of the disclosed embodiments are also possible.

Figure 1:
FIG. 1 is schematic block diagram of an exemplary 1×8 receiver array apparatus incorporating aspects of the disclosed embodiments.

FIG. 1 is a schematic block diagram of an exemplary apparatus 100 incorporating aspects of the disclosed embodiments. As shown in FIG. 1, the apparatus 100 generally includes an input waveguide assembly 10 and a receiver array 20. The receiver array 20 of the disclosed embodiments generally comprises a highly compact and sensitive 500-600 GHz, 1×8 receiver array. The circuits of the receiver array 20, as is described further herein, are integrated into a single block to provide a heterodyne receiver that has lower SWaP (Size, Waight, and Power) for planetary science applications, as well as other applications in communication and military imaging systems.

The receiver array 20 of the disclosed embodiments is configured to have a conversion loss of less than approximately 11 decibels (dB), a noise temperature of less than 2000 degrees Kelvin (K) at 540 GHz, and a wide intermediate frequency (IF) bandwidth of approximately 70 Gigahertz (GHz). The receiver array 20 is generally configured to simultaneously detect at least fourteen molecular species in the 530-600 GHz range, including species such as water ($H_2{}^{16}O$-559.9 GHz), deuterium oxide (HDO-539.0 GHz), and oxygen ($O_3$-570.1 GHz).

In the example of FIG. 1, the receiver array 20 includes a first splitter circuit 110 and a second splitter circuit 210. The first splitter circuit 110 and the second splitter circuit 210 are generally configured to receive input signals from the input circuit assembly 10, an example of which is shown in FIG. 1 for illustration purposes only.

As shown in the example of FIG. 1, in one embodiment, the frequency of the detected input signal 12 is in the range of to and including 6.67 GHz to 8.33 GHZ. The input signal 12 is divided by waveguides 14, 16, which are configured to provide signals in the range of to and including 80 GHz to 100 GHz to the splitter circuits 110, 210, respectively. The aspects of the disclosed embodiments are not intended to be limited by the particular structure of the input circuit assembly 10 shown in FIG. 1. In alternate embodiments, any suitable circuit can provide the input signal(s) to the receiver array 20, other than including the input circuit assembly 10 of FIG. 1.

The splitter circuits 110, 210 are generally configured to divide the power of the received input signal. In one embodiment, the outputs of the respective splitter circuits 110, 120 are provided to respective amplifiers 112, 114 and 212, 214.

In one embodiment, the receiver array 20 includes Tripler circuits, generally illustrated as Tripler circuits 116, 118 and 216 and 218. The Tripler circuits 116, 118, 216 and 218 are configured to be connected or otherwise coupled in the respective path between the splitters 110, 210 and the respective hybrid power splitters 120, 122, 220 and 222. As shown in the example of FIG. 1, there are four Tripler circuits for this 1×8 receiver array.

The Tripler circuit(s) 116, 118 and 216 and 216 of the disclosed embodiments is generally configured to multiply a frequency of the input signal by a factor of 3 (×3). In the example of FIG. 1, this takes the from the input waveguides 14, 16 (80-100 GHz) to 240-300 GHz.

The output of the Tripler circuit(s) 116, 118, 216 and 218 is provided to a second power splitter 120, 122, 220 and 222, respectively. In one embodiment, the second power splitter 120, 122, 220 and 222 comprises a hybrid power splitter. In the example of FIG. 1, there are four second power splitters, one at the output of each of the four Tripler circuits, respectively.

Figure 2:
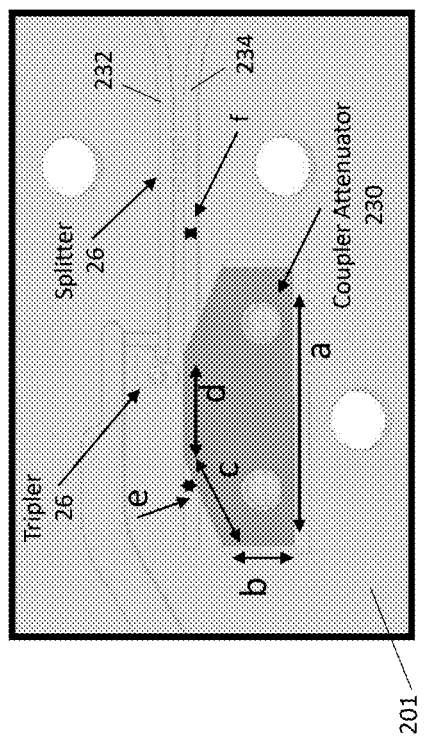
FIG. 2 is a schematic block diagram of an exemplary attenuator coupler for a 1×8 receiver array apparatus incorporating aspects of the disclosed embodiments.
Figure 5:
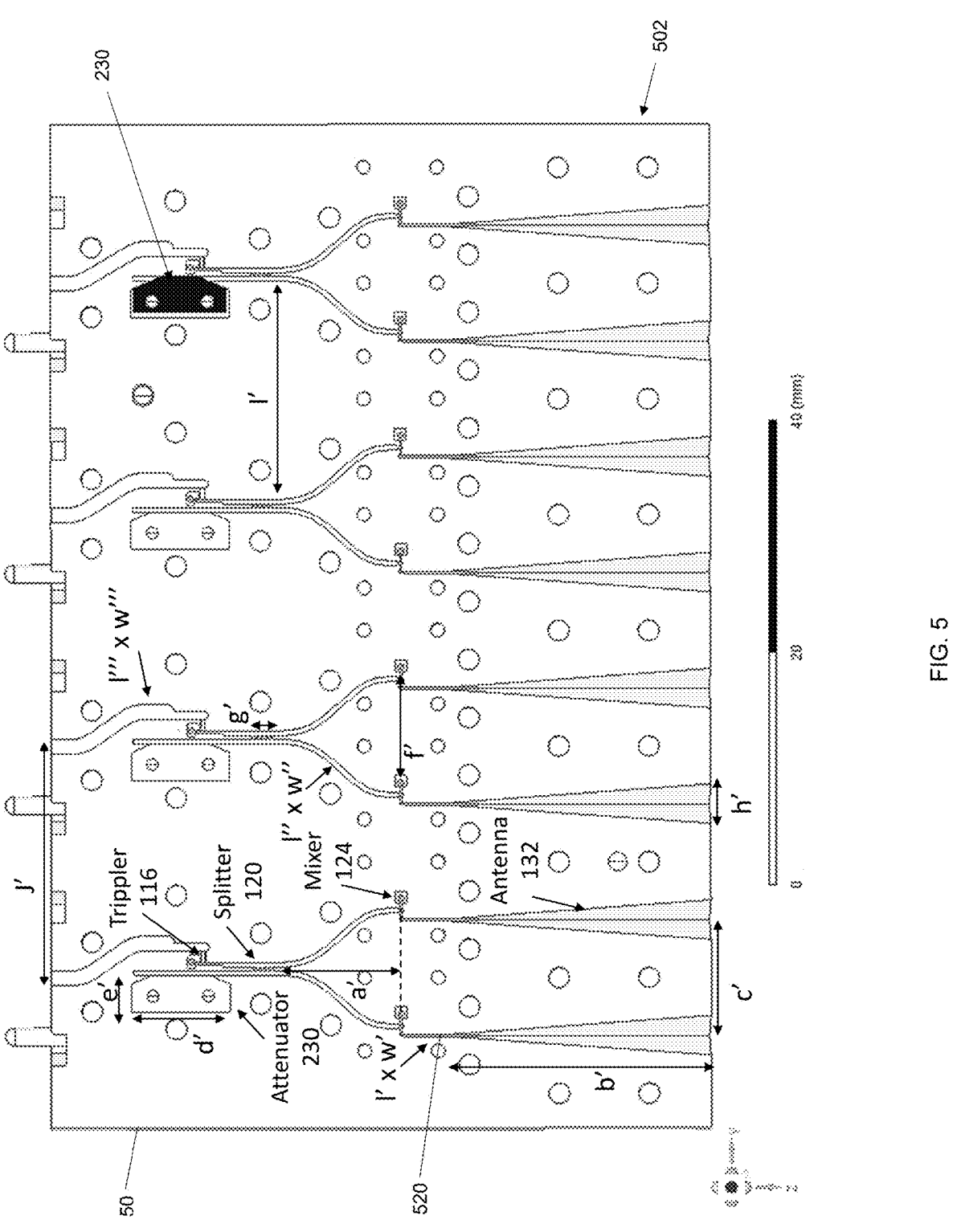
FIG. 5 is a schematic block diagram illustrating an exemplary waveguide channel topology for a 1×8 receiver array apparatus incorporating aspects of the disclosed embodiments.

Referring also to FIG. 2, in one embodiment, the second power splitter(s) 120, 122, 220 and 222, shown as power splitter 26 in FIG. 2, can include a waveguide attenuator 230, also referred to as a coupler attenuator or power dump. As shown in the example of FIG. 2, the waveguide attenuator 230 can be integrated with the power splitter 26. In one embodiment, the waveguide attenuator 230 comprises an attenuator film embedded on a waveguide, an example of which is shown in FIG. 5. The waveguide attenuator 230 is generally configured to balance the power split of the splitter 26. As is illustrated in the example of FIG. 2, a Trippler circuit 24 is shown with respect to the splitter circuit 26.

Table 1 below illustrates exemplary dimensions of the waveguide attenuator 230 shown in FIG. 2.

TABLE 1

| PARAMETER | DIMENSION |
| --- | --- |
| a | 8 mm |
| b | 2 mm |
| c | 2.74 mm |
| d | 3 mm |
| e* | 50 μm |
| f* | 432 μm |

*The dimensions e and f reflect a gap or spacing between a surface of the coupler attenuator 230 and a surface of the substrate 201.

In one embodiment, design of the waveguide attenuator 230 can include a trapezoidal resistive film of an approximately 75 micrometer (μm) thick substrate that is integrated by suspending into the waveguide structure of the power splitter 26. The design of the waveguide attenuator 230 can provide a better than 20 dB attenuator that is configured to balance the power split between channels 232 and 234. The design of the waveguide attenuator 230 is scalable for frequencies in the range of 1 GHz to and above the 1 THz range.

Figure 3:
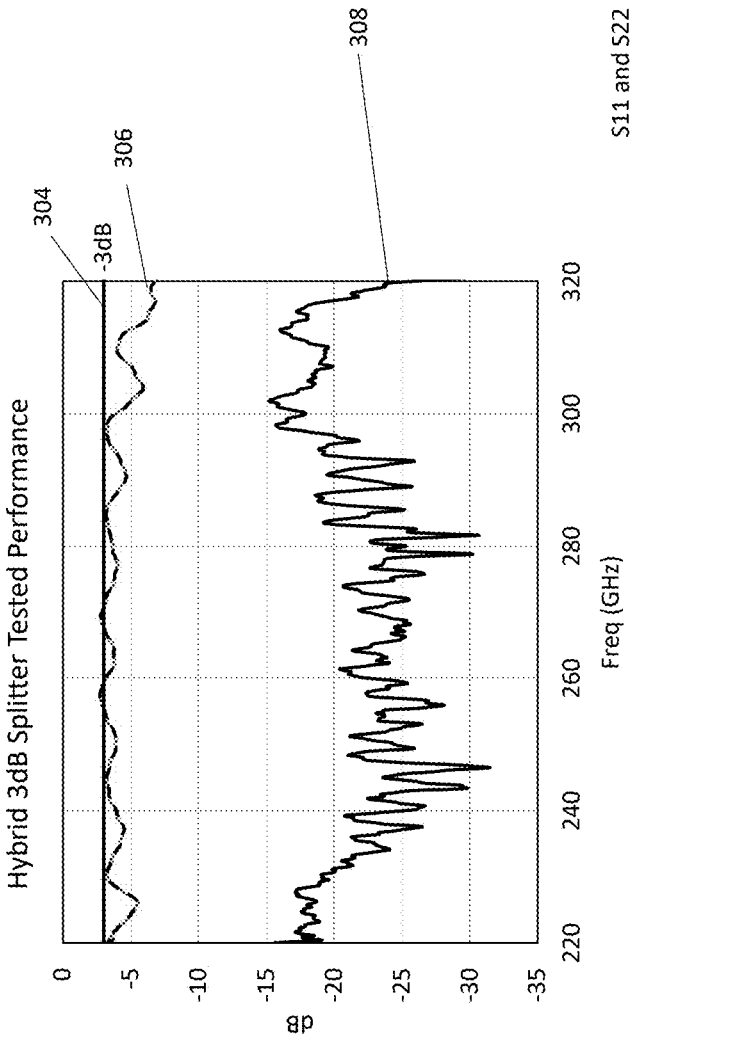
FIG. 3 is a graph illustrating performance characteristics of an exemplary hybrid power splitter for a 1×8 receiver array apparatus incorporating aspects of the disclosed embodiments.

FIG. 3 is a graph illustrating tested performance of the power splitter 26 of FIG. 2 under test. Line 304 illustrates the −3 dB line. Line 306 illustrates the split between the left 232 and right 234 junctions of the splitter circuit 26 shown in FIG. 2. The returned power is illustrated by line 308. Between approximately 240 GHz and 280 GHz, the power return is approximately −20 dB and a directivity of ~25 dB. Thus, approximately 99 percent of the power is delivered by the power splitter 26 with integrated attenuator card 230.

Referring again to FIG. 1, the output of each second splitter 120, 122, 220 and 222 is delivered to a respective mixer circuit or device 124, 126, 128, 130, 224, 226, 228 and 230. The mixer circuits 124, 126, 128, 130, 224, 226, 228 and 230 generally comprise subharmonic mixer circuits or devices, one for each of the eight channels shown in FIG. 1. Thus, in the embodiment illustrated in FIG. 1, there are eight (8) mixer circuits.

In one embodiment, the eight mixer circuit(s) 124, 126, 128, 130, 224, 226, 228 and 230 generally comprise a sensitive and broadband sub-harmonic mixer circuit for a 480-600 GHz band. As will be described further herein, the mixer circuit(s) or device(s) 124, 126, 128, 130, 224, 226, 228 and 230 is a three-port device configured to allow the Local Oscillator (LO) signal, a Radio Frequency (RF) signal, and an Intermediate Frequency (IF) signal.

Figure 4:
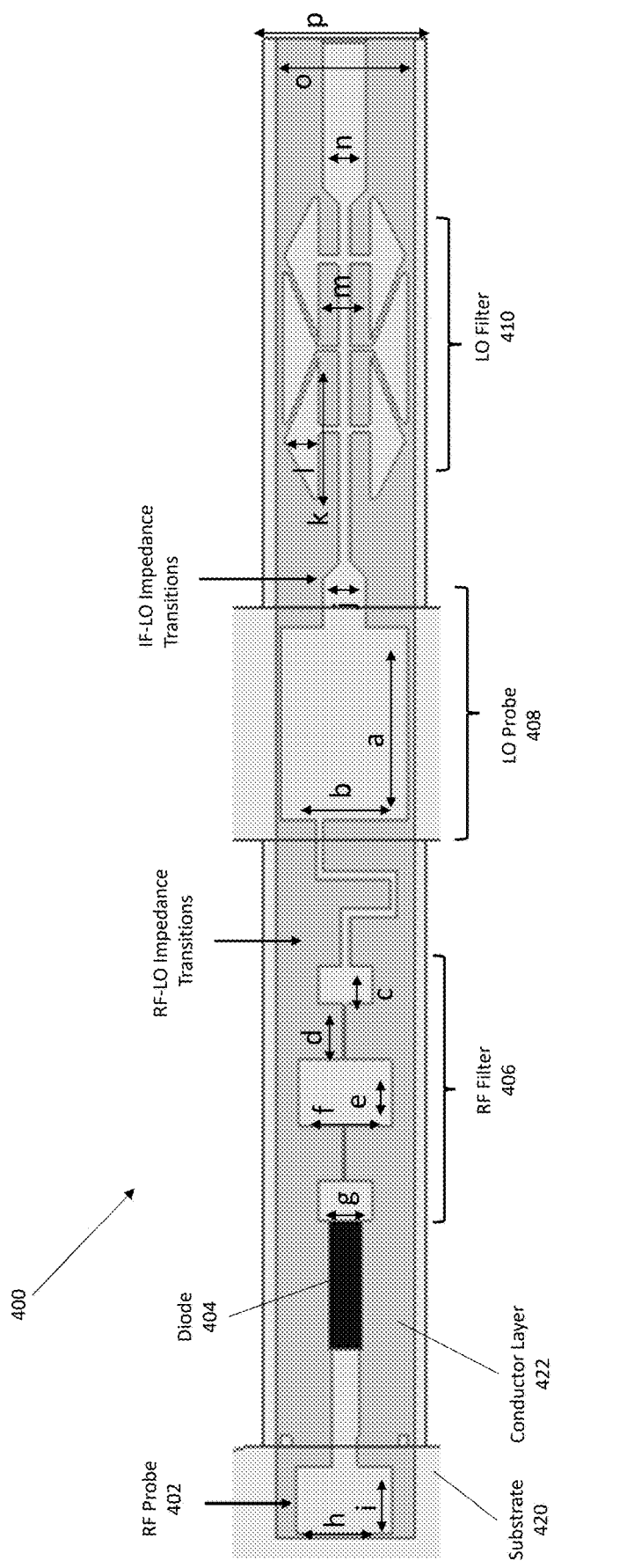
FIG. 4 is a schematic block diagram of a mixer circuit for a 1×8 receiver array apparatus incorporating aspects of the disclosed embodiments.

Referring to FIG. 4, one example of a mixer circuit 400, such as that referred to with respect to FIG. 1, is illustrated. In one embodiment, the mixer circuit 400 is designed on a substrate 420, which in one embodiment is a Quartz substrate, which provides a lower dielectric constant (Er=4). A thickness of the substrate 420 can be approximately 20 micrometers (μm). A conductor layer 422 of the mixer circuit 400 can comprise a 0.5 μm gold metal that is deposited on the Quartz substrate 420.

In one embodiment, the mixer circuit or device 400 is a three-port device configured to allow the Local Oscillator (LO) signal, a Radio Frequency (RF) signal, and an Intermediate Frequency (IF) signal. The mixer circuit 400 can include a WR-3.4 LO waveguide probe 408 to allow a 265-300 GHz input signal, an RF waveguide probe 402 with a WR-1.5 band, and a highly compact 70 GHz IF filter 410 to stop the Local Oscillator, an RF filter 406 to block the RF signal, and Schottky diode 404 (a nonlinear sensor). In accordance with the aspects of the disclosed embodiments, these structures are all integrated into one chip with an approximately 136 um×1.435 mm final dimension and with circuit A-H diminutions, as illustrated in TABLE 2, below. The design and fabrication of the sub-harmonic mixer circuit 400 is scalable for frequencies in the 1 GHz to above 1 THz range.

TABLE 2

| PARAMETER | DIMENSION(μM) | PARAMETER | DIMENSION(μM) |
|---|---|---|---|
| A | 190 | i | 62 |
| B | 126 | j | 41 |
| C | 38.5 | k | 140 |
| D | 55 | l | 38 |
| E | 50 | m | 50 |
| F | 90 | n | 45 |
| G | 67 | o | 136 |
| H | 95 | p | 156 |

In the example of FIG. 1, the output of the receiver array 20 comprises antenna(s) 132, 134, 136, 138, 232, 234, 236 and 238. For the example of FIG. 1, there are eight (8) antennas, one coupled to each of the mixers. The antenna(s) 132, 134, 136, 138, 232, 234, 236 and 238 can generally comprise horn antennas. The output of the antenna(s) 132, 134, 136, 138, 232, 234, 236 and 238 is generally in the range of, to and including, 480 to 750 GHz.

Referring to FIG. 5, the circuits of the receiver array 20 shown in FIG. 1 are configured to be integrated on a waveguide block 50. Dimensions of the channels of the exemplary receiver array 20 of FIG. 5 are presented in Table 3, below.

TABLE 3

| PARAMETER | DIMENSION |
|---|---|
| a' | 11.12 mm |
| b' | 22.5 mm |
| c' | 9 mm |
| d' | 8.5 mm |
| e' | 2.4 mm |
| f' | 10 mm |
| g' | 1.7 mm |
| h' | 3.3 mm |
| l' | 18 mm |
| J' | 20 mm |
| l' × w' | 190 μm × 190 μm |
| l" × w" | 432 μm × 432 μm |
| l''' × w''' | 1.27 mm × 1.27 mm |

FIG. 5 illustrates one example of an antenna assembly 502 of the array apparatus 100 of FIG. 1. In this example, the antenna assembly 502 for the 1×8 array comprises eight diagonal horn antennas, such as antenna 132. The antennas of the disclosed embodiments are generally configured to provide approximately 24 dB gain. In alternate embodiments, any suitable antenna structure can be used, other than including a horn antenna, while providing the advantages described herein.

The center-to-center spacing of the antennas in the antenna assembly 502 in this example is approximately 9 millimeters (mm). A dimension of the mounting substrate or array block 50 shown in FIG. 5 can be approximately 62 mm front to back and 81 mm side to side. The tightly packed design of the antenna assembly 502 of the apparatus 100 is configured to provide better resolutions (7 mRad) in the imaging system and improve the stands pix-pixel-based cascaded gap by a factor of two, as compared to a standard design. In addition, the total area and mass can be reduced by a factor of greater than 4 and the power can also be reduced by a factor of greater than 4.

In one embodiment, the input waveguides 520 of respective ones of the horn antennas shown in FIG. 5, such as antenna 132, generally comprise WR (waveguide rectangular)-1.5 band waveguides. The input waveguides 520 are generally configured to allow a broadband 500-750 GHz frequency.

Figure 6:
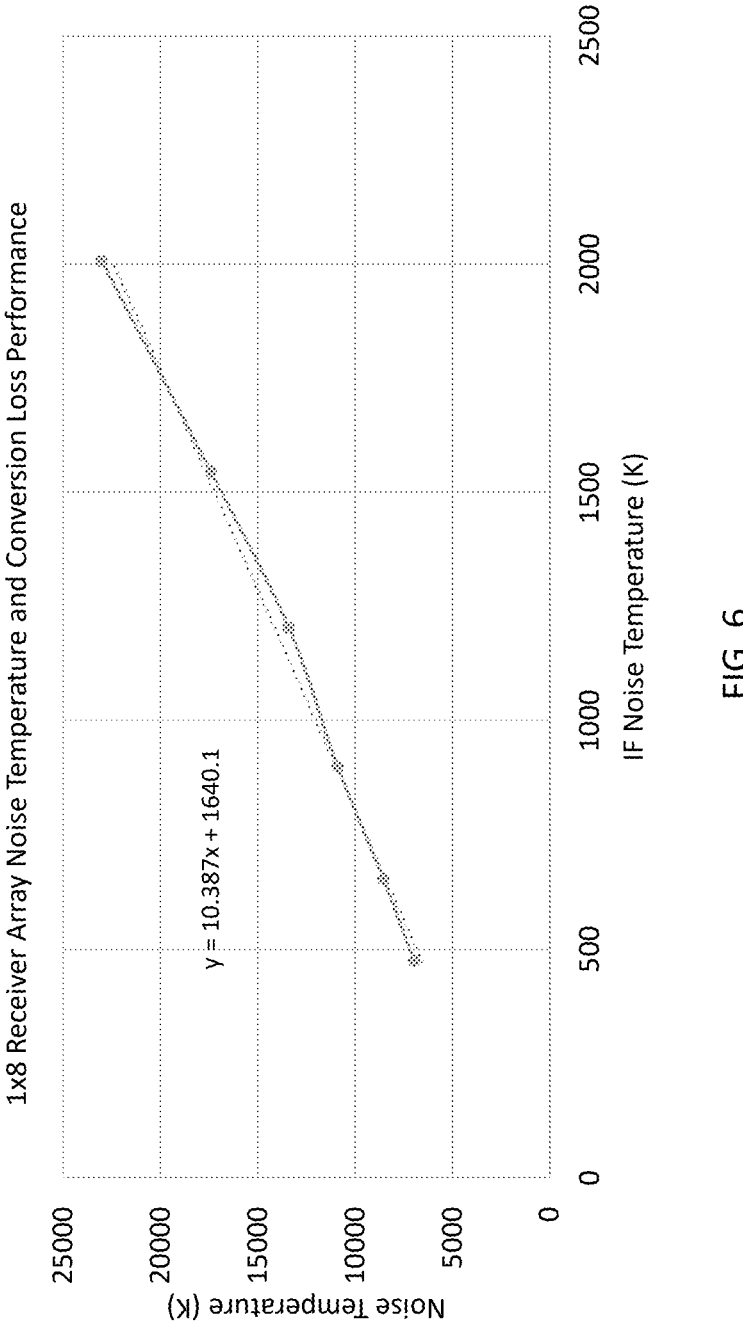
FIG. 6 is a graph illustrating noise temperature and conversion loss performance for a 1×8 receiver array apparatus incorporating aspects of the disclosed embodiments.

The apparatus 100 provides an array system with a multi-pixel approach that has enhanced simultaneous detection capability and reduces size, weight, and power (SWaP) by a factor of 3-4 compared to current cascaded systems. As is illustrated in the graph of FIG. 6, each pixel of the apparatus 100 is configured to provide a system noise temperature of less than 2,000 Kelvin (K) at 540 GHz, which improves the sensitivity by a factor of two or more compared to the cascades system approach. In addition, the multipixel arrangement enhances the sensitivity of the total receiver by a factor of Vn, where n is the number of pixels. As shown by the graph in FIG. 6, the Double Side Band (DSB) Noise Temperature and Conversion Loss Performance of the apparatus 100 are 1,640 K and 10.38 dB at 540 GHz, which is two times better than current systems.

Figure 7:
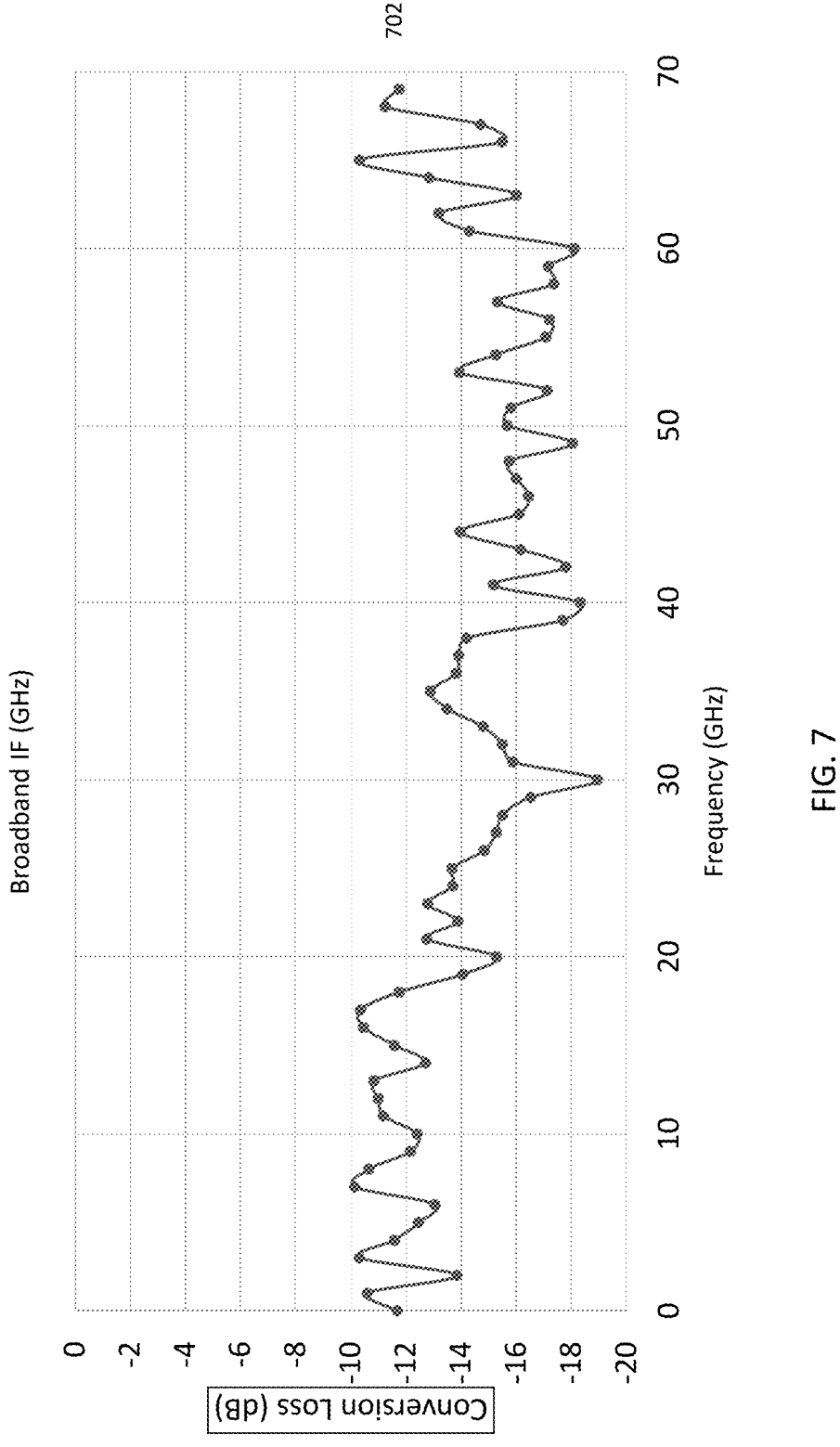
FIG. 7 is a graph illustrating intermediate frequency performance for a 1×8 receiver array apparatus incorporating aspects of the disclosed embodiments.

Referring to FIG. 7, the graph 700 illustrates the Intermediate Frequency for the receiver array 100 of the disclosed embodiments. From approximately DC to 70 GHz the conversion loss is better than −20 dB.

The apparatus 100 integrates power splitters, frequency Tripler circuits, subharmonic mixers, and antennas on a single block. The tightly packaged 530-600 GHz array improves the pixel-pixel gap from 22 mm down to approximately 9 mm, which is an improvement over current pixel gap and resolution by a factor of more than 2.

The receiver apparatus of the disclosed embodiments provides a wide IF bandwidth of greater than approximately 70 GHz during the receiver-down conversion process, which will allow simultaneous molecular line detection for application in astronomy and emerging communication devices. This improves the state of the art 530-600 GHz receiver IF bandwidth by factor of two or more, as is illustrated by the graph 702 of FIG. 7.

The apparatus 100 of the disclosed embodiments also provides improved compactness and reduces the DC power consumption by a factor of more than four compared to other available cascaded system technologies. For example, to demonstrate the 1×8 pixel, the total DC power is 10-12 Watt. By comparison, when the commonly used cascaded system (bulky) to develop the receiver is applied with a similar number of pixels, the DC power will be more than 40 Watt (given an average single pixel power consumption of 5 Watt).

The apparatus 100 of the disclosed embodiments will include a novel wideband mixer with a ~70 GHz bandwidth design that simultaneously detects fourteen molecular species in the 530-600 GHz. These can include species such as water (H$_2$$^{16}$O-559.9 GHz), deuterium oxide (HDO-539.0 GHz), and oxygen (O$_3$-570.1 GHz), for example.

The aspects of the disclosed embodiments provide new circuits that are integrated into a single block to develop a heterodyne receiver that has lower SWaP (Size, Weight, and Power) for planetary science application as well as other application in communication and military imaging systems. In addition, the current single-pixel cascades topology has a narrow IF bandwidth that limits the frequency window of molecular detection during the receiver down-conversion process.

The apparatus of the disclosed embodiments provides commercialization potentials to develop a multipixel and wideband receiver, spectrometer, and radar technologies for applications such as, astronomy, plasma fusion, military, and emerging communication technologies such as 5G and 6G. Furthermore, the apparatus of the disclosed embodiments provide commercial applications due to the design topology scalability for ranges of frequencies in the range of 1 GHz to THz and center frequency tunability by adjusting design parameters.

Modifications to embodiments of the aspects of the disclosed embodiments described in the foregoing are possible without departing from the scope of the aspects of the disclosed embodiments as defined by the accompanying claims. Expressions such as "including", "comprising", "incorporating", "have", "is" used to describe and claim the aspects of the disclosed embodiments are intended to be construed in a non-exclusive manner, namely allowing for items, components or elements not explicitly described also to be present. Reference to the singular is also to be construed to relate to the plural.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A waveguide receiver apparatus comprising:
a 1×8 receiver array disposed on a waveguide substrate, the receiver array comprising a first circuit branch and a second circuit branch, wherein the first circuit branch and the second circuit branch each comprise: a first splitter circuit configured to divide an input signal;
a first Tripler circuit coupled to a first output of the first splitter circuit and a second Tripler circuit coupled to a second output of the first splitter circuit;
a second splitter circuit coupled to an output of the first Tripler circuit and a third splitter circuit coupled to an output of the second Tripler circuit;

a first mixer circuit coupled to a first output of the second splitter circuit and a second mixer circuit coupled to a second output of the second splitter circuit;
a third mixer circuit coupled to a first output of the third splitter circuit and a fourth mixer circuit coupled to a second output of the third splitter circuit;
a first antenna coupled to an output of the first mixer circuit;
a second antenna coupled to an output of the second mixer circuit;
a third antenna coupled to an output of the third mixer circuit; and
a fourth antenna coupled to an output of the fourth mixer circuit.

2. The apparatus according to claim 1, wherein the second splitter circuit and the third splitter circuit each respectively comprise a hybrid power splitter circuit with an integrated coupler attenuator.

3. The apparatus according to claim 2, wherein the integrated coupler attenuator comprises a waveguide suspended attenuator film embedded on the waveguide substrate.

4. The apparatus according to claim 3, wherein the attenuator film has a trapezoidal shape.

5. The apparatus according to claim 3, wherein the attenuator film is a 75 micrometer (µm) thick substrate on a surface of the waveguide substrate.

6. The apparatus according to claim 5, wherein the attenuator film is suspended 150 µm into the waveguide with a 50 µm gap.

7. The apparatus according to claim 2, wherein the integrated power coupler is configured to balance a power split of a respective splitter circuit.

8. The apparatus according to claim 2, wherein the hybrid power splitter circuit is configured to divide a signal at frequencies in the range of 240-300 Gigahertz (GHz).

9. The apparatus according to claim 1, wherein a mixer circuit of one or more of the first mixer circuit, second mixer circuit, third mixer circuit and fourth mixer circuit comprises a sub-harmonic mixer circuit configured for a 530-600 GHz band with ultrawide IF bandwidth.

10. The apparatus according to claim 9, wherein the mixer circuit comprises a three-port device configured to allow a local oscillator signal, a radio frequency signal and an intermediate frequency signal.

11. The apparatus according to claim 9, wherein, the mixer circuit comprises a conductor layer of 0.5 µm gold metal deposited on a quartz substrate.

12. The apparatus according to claim 1 wherein a splitter circuit of one or more of the first splitter circuit and the second splitter circuit is configured to divide the input signal at frequencies in a range of 80-100 GHz.

13. The apparatus according to claim 1, wherein a frequency at an output of one or more of the first Tripler circuit and second Tripler circuit in the range of 240-300 GHz.

14. The apparatus according to claim 1, wherein at least one of the first antenna, the second antenna, the third antenna and the fourth antenna comprises a horn antenna.

15. The apparatus according to claim 14, wherein an output of the antenna is in a range of 480-600 GHz.

16. The apparatus according to claim 14, wherein a center-to-center spacing of adjacent antennas of the first antenna, the second antenna, the third antenna and the fourth antenna is 9 millimeters.

17. The apparatus according to claim 16, wherein the center-to-center spacing is configured to provide higher than 7 milliradian (mrad) spatial resolution.

18. The apparatus according to claim 1, wherein the 1×8 receiver array is integrated on a waveguide array block.

19. The apparatus according to claim 18, wherein dimensions of the waveguide array block are 62 mm×81 mm.

20. The apparatus according to claim 1, wherein the 1×8 receiver array comprises four Tripler circuits, eight mixer circuits and eight antennas.

* * * * *